United States Patent [19]

Lami

[11] 4,117,706
[45] Oct. 3, 1978

[54] REMOTELY ADJUSTABLE HYDRAULIC PRESSURE REGULATOR

[75] Inventor: Richard A. Lami, Hennepin, Ill.

[73] Assignee: Jones & Laughlin Steel Corporation, Pittsburgh, Pa.

[21] Appl. No.: 835,888

[22] Filed: Sep. 23, 1977

[51] Int. Cl.² ............................................. B21B 31/32
[52] U.S. Cl. ..................................... 72/245; 137/102; 137/596.18; 91/433
[58] Field of Search ........................... 72/245, 20, 21; 137/102, 596.15, 596.18; 91/433

[56] References Cited

U.S. PATENT DOCUMENTS

| | | | |
|---|---|---|---|
| 3,250,105 | 5/1966 | Stone | 72/240 |
| 3,373,591 | 3/1968 | O'Brien et al. | 72/245 |
| 3,477,465 | 11/1969 | Town | 137/596.18 |

Primary Examiner—Milton S. Mehr
Attorney, Agent, or Firm—Robert D. Yeager

[57] ABSTRACT

A remotely adjustable back pressure relieving hydraulic regulator system particularly suitable for use on the work roll bending and balancing systems of a rolling mill. A normally open air operated valve and a normally closed air operated valve are modified and interconnected to provide the disclosed remotely adjustable pressure regulator. The normally closed valve is connected to a pressurized hydraulic supply. The normally closed regulating valve opens in response to a control air pressure signal applied thereto and is modified to close when the hydraulic pressure at its outlet port exceeds a desired or selected pressure. The pressure at the outlet of the pressure regulating valve required to move it to the closed position depends on the pressure of the applied air control signal. Thus, as the pressure of the air control varies, the hydraulic pressure required to close the valve also varies. The outlet of the pressure regulating valve is connected to a rolling mill and also to the inlet of a pressure relief valve.

20 Claims, 7 Drawing Figures

REMOTELY ADJUSTABLE HYDRAULIC PRESSURE REGULATOR

BACKGROUND OF THE INVENTION

1. Field of the Invention

This invention relates to a pressure regulator and more particularly to a remotely adjustable back pressure relieving hydraulic regulator system.

2. Description of the Prior Art

Electro mechanical pressure regulators for use on a rolling mill have been used. These units, however, are relatively expensive and are difficult to maintain.

Various systems have been disclosed for hydraulic pressure regulation for rolling mills. U.S. Pat. Nos. 3,974,672; 3,803,886; 3,416,341; 3,373,591; 3,319,444; 3,191,408 and 3,024,679 are exemplary of prior art hydraulic controls for use with a rolling mill.

SUMMARY OF THE INVENTION

The present invention relates to an improved remotely controllable hydraulic pressure regulator for controlling the pressure of hydraulic fluids supplied to a rolling mill. The disclosed pressure regulator is remotely adjustable in response to the pressure of an operation air signal. The regulated hydraulic pressure varies as a function of the operating air pressure.

The disclosed pressure regulator utilizes a normally closed air operated valve connected to the hydraulic supply to regulate the pressure of the incoming hydraulic fluid and a normally open air operated valve connected to the hydraulic return to relieve any excess pressure on the hydraulic system of the rolling mill. The normally closed regulating valve is modified to be biased to the closed position by the pressure of the hydraulic fluid at its outlet. The normally closed regulating valve is biased to the open position by the air pressure supplied to its air operating mechanism. When the bias provided by the hydraulic pressure at its outlet overcomes the bias provided by the operating air pressure the valve closes. The pressure relief valve is modified to be biased to the open position by the hydraulic pressure at its inlet. When the pressure at the inlet to the relief valve provides a bias sufficient to overcome the bias provided by the air pressure supplied to its air operator, the pressure relief valve opens reducing pressure to the rolling mill's hydraulic system. The outlet of the normally closed pressure regulating valve is connected to the rolling mill's hydraulic system and to the inlet of the normally open pressure relief valve. With the same applied operating air pressure, the hydralic pressure required to open the relief valve is slightly greater than the hydraulic pressure required to close the regulating valve. This pressure differential, when the operating points of the regulating valve and the relief valve are plotted as a function of the control air pressure, is called the system's deadband. For a given control air operating pressure the regulated hydraulic pressure will be maintained within the deadband.

The connections for providing the hydraulic biasing of the regulating and relief valves can be made externally. However, it is preferable to provide internal passages for supplying the pressurized hydraulic fluid to the bottom of the valve spool. For the normally closed pressure regulating valve, an internal passage is provided from its outlet to a chamber beneath the operating spool. For the normally open pressure relief valve, an internal passage is provided from its inlet to a chamber beneath the bottom of the operating spool. The control air pressure through a diaphragm and appropriate mechanical connections biases the spool of the normally closed pressure regulating valve to the open position. The hydraulic pressure applied to the bottom of the spool biases it to the closed position. When the hydraulic pressure bias overcomes the control air operating pressure bias, the valve closes and pressure is limited at this level. The normally open pressure relief valve is biased to the closed position by an air operator connected through appropriate mechanical linkages to the valve operating spool. The hydraulic operating fluid is conducted from its inlet through a passage to a chamber at the bottom of the spool. The pressure of the hydraulic operating fluid at the inlet to the pressure relief valve biases the spool to the open position. When the hydraulic fluid pressure bias on the spool overcomes the operating air pressure bias, the relief valve opens reducing the pressure of the hydraulic operating system. With the same operating air pressure applied thereto, the relief valve opens at a pressure slightly greater than the pressure at which the regulating valve closes and therefore the hydraulic system operating pressure is maintained somewhere between the required hydraulic operating pressure for the regulating valve and the required hydraulic operating pressure for the relief valve.

The points at which the regulating valve and the relief valve operates can be changed by modifications to the valve such as changing the strengths of springs or adding springs where desired. As the pressure of the control air is changed, the hydraulic system pressure at which the regulating valve closes and the relief valve opens also changes. The hydraulic operating points of the regulating valve and the relief valve change together so that for all operating air pressures, the relief valve operates at a hydraulic pressure slightly greater than that required to operate the regulating valve. This provides for an easily adjustable pressure regulator. The disclosed pressure regulator is rugged and relatively inexpensive. The air supply pressure adjustment can be remote from the air operated valves providing a remotely operable pressure regulating device. Air operated valves are particularly suitable for the rugged application required of steel mill apparatus. These valves are rugged, reliable, and present no danger of electrical shock or possible fire hazard as might be the case with electrically operated apparatus.

The regulating valve and the relief valve are both provided with a small passage that extends beneath a lower sealing ring provided around the operating spool. When the O-ring fails or is damaged, fluid which bypasses the ring flows through this passage and this provides an external indication to the operator that the O-ring seal is damaged and needs to be replaced.

The disclosed valves are rugged, carry a high volume flow and are particularly suitable for operation with the preferred hydraulic fluid which is mostly water. The fluid utilized is about 97% water and 3% water soluble mineral oil. Compared to a hydraulic operating fluid which has a higher oil content or better lubricating qualities, the fluid utilized is relatively erosive. However, this fluid has the advantage of being fire proof and does not present a fire hazard. It is also relatively inexpensive. The disclosed regulator must be capable of handling large quantities of the hydraulic fluid required and not be adversely affected by its erosive properties.

It is an object of this invention to teach an air-operated remotely adjustable back pressure relieving hydraulic regulator.

It is a further object of this invention to teach a remotely adjustable hydraulic regulator which is relatively rugged and inexpensive to construct.

BRIEF DESCRIPTION OF THE DRAWINGS

For a better understanding of the invention, reference may be had to the preferred embodiments exemplary of the invention shown in the accompanying drawings in which.

DESCRIPTION OF THE PREFERRED EMBODIMENTS

Figure 1:
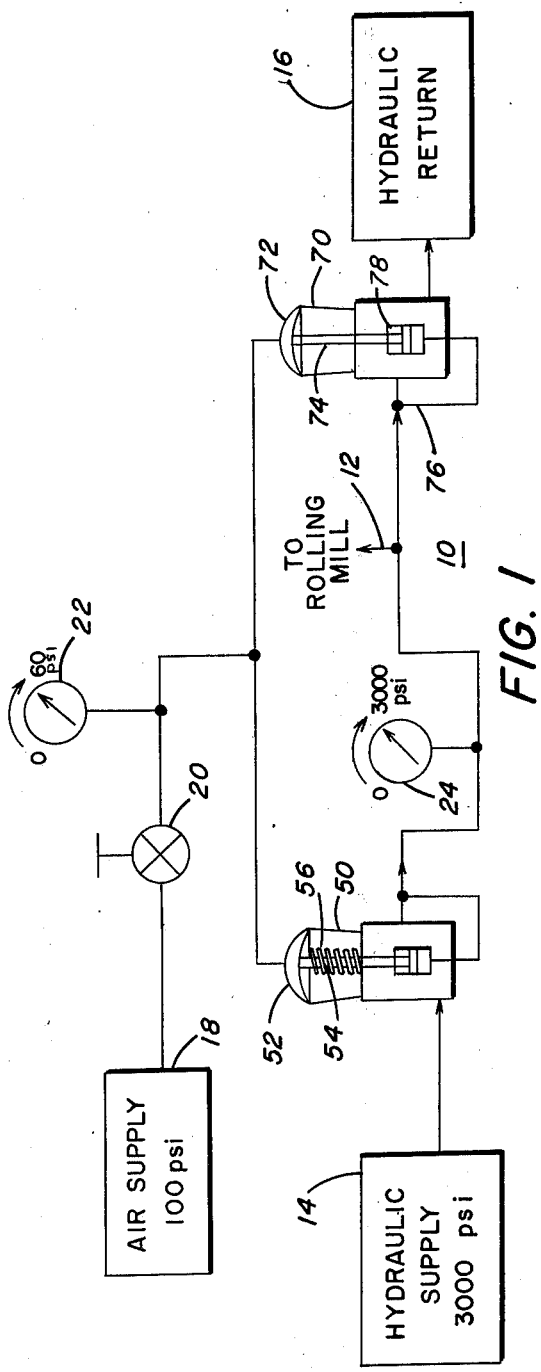
FIG. 1 is a schematic view of a hyraulic system utilizing the teaching of the present invention.

Referring now to the drawings, and FIG. 1 in particular, there is shown a pressure regulating system 10 constructed according to the teaching of the present invention. Pressurized hydraulic fluid for roll contouring is applied to a rolling mill along line 12. Hydraulic supply 14 provides hydraulic fluid at a pressure of approximately 3000 psi to the regulator system 10. When necessary hydraulic fluid is returned from the pressure regulating system to hydraulic return 16. Air from air supply 18, through an air regulator 20, controls pressure regulating system 10. The air pressure selected by air regulator 20 determines the regulated pressure of the hydraulic fluid applied to the rolling mill. Using air regulator 20 to change the pressure of the control air provides for remote adjustment of the hydraulic pressure regulator system 10. For the preferred regulator, the air pressure can be varried from 0 to 60 psi and this will cause the pressure of the hydraulic fluid supplied to the rolling mill to vary from 600 to 3000 psi. An air pressure gauge 22 is provided for indicating the air pressure provided by air regulator 20. Hydraulic pressure gauge 24 is provided for indicating the pressure of the hydraulic fluid supplied to the rolling mill.

Pressure regulating system 10 utilizes a normally closed regulating valve 50 and a normally open relief valve 70. Valve 50 is an air operated valve. When air pressure is applied to air operator head 52, control stem 54 moves downward opening a passage through valve 50. Pressure regulator valve 50 is constructed to be biased to the closed position by hydraulic pressure at its outlet. As shown schematically in FIG. 1, pressure at the outlet of valve 50 biases control stem 54 upward towards a closed position. The air pressure, applied to air operator 52, biases valve 50 towards an open position and the hydraulic pressure, at the outlet of valve 50, biases the valve to a closed position. Thus, the position of the valve 50 is determined by the relative strength of the air pressure applied to the air operator 52 and the hydraulic fluid pressure present at the outlet of valve 50. A spring 56 also biases stem 54 upward towards a closed position. It can thus be seen that the hydraulic pressure at the outlet of valve 50 required to close valve 50 is proportional to the air pressure applied to air operator 52. Thus by varying the air pressure applied to air operator 52, the hydraulic pressure required to close valve 50 can also be varied. Valve 50 will thus close to provide an outlet pressure which is a function of the air pressure applied to air operator 52.

In the preferred embodiment when the air pressure applied to air operator 52 has a range of 0 to 60 psi, the pressure at the outlet of valve 50 has a range of 0 to 3000 psi. The range of the outlet hydraulic fluid pressure relative to the range of the air operator pressure can be varied by changing various valve parameters such as the strength of spring 56, the area of the spool upon which the hydraulic fluid can act, or the area of the diaphragm in operator 52 upon which the control air can act. It can thus be seen that valve 50 regulates the pressure of the hydraulic fluid supplied by hydraulic supply 14. However, when there is pressure greater than desired in the hydraulic fluid system to the rolling mill, pressure relief is required. Pressure relief is accomplished through normally open valve 70. Valve 70 is controlled to relieve the hydraulic pressure when it passes a pressure level slightly above the pressure level set for the outlet of regulating valve 50. Relief valve 70 accomplishes this by venting hydraulic fluid to hydraulic return 16.

When control air pressure from regulator 20 is applied to air operator 72, control stem 74 is moved downward closing valve 70. Regulator 10 is contructed so that hydraulic pressure present at the inlet to relief valve 70 biases operating stem 74 upward to an open position. When valve 70 is open, a passage exits from its inlet to its outlet. As shown schematically in FIG. 1 a hydraulic connection 76 is formed to the bottom of the hydraulic piston 78. Hydraulic piston 78 is connected to operating stem 74 for unitary movement. When the force due to the hydraulic pressure applied to piston 78 exceeds the force due to the air pressure applied to the diaphragm in air operator 72 the operating stem 74 is moved upward, opening valve 70 and relieving the pressure to the rolling mill. The required pressure on hydraulic piston 78 to open valve 70 is determined by the area of piston 78 upon which the hydraulic fluid acts and the area of air operator 72 upon which the operating air acts. The pressure at which valve 70 opens can thus be changed by changing the effective area of the hydraulic piston, by changing the effective area of the air operator, or by adding an appropriate biasing spring to stem 74. The same control operating air pressure is applied to both air operators 52 and 72. Thus as the control air pressure varies the points at which valves 50 and 70 operate will vary together.

Figure 7:
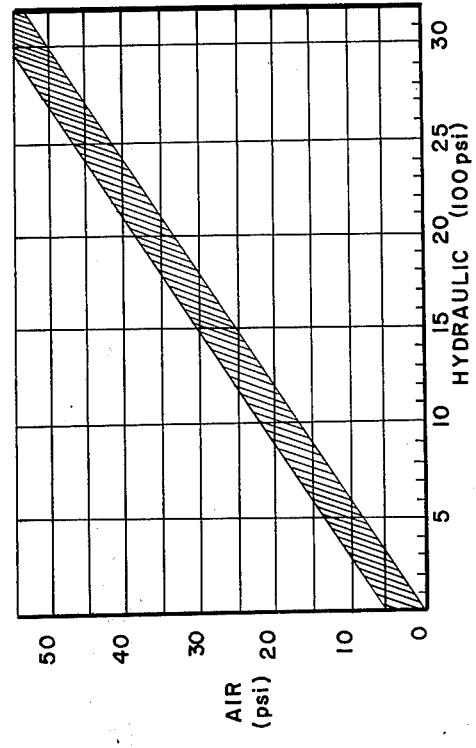

FIG. 7 illustrates the hydraulic pressures at which valves 50 and 70 operate for various operating air pressures. The air between where the regulating valve 50 closes and the relief valve 70 opens is referred to as the deadband of the system. This deadband can be made smaller if desired by appropriate modifications of valves 50 or 70. A deadband as small as ±50 psi can be achieved by proper modifications of valves 50 and 70. For the system illustrated, for a 40 psi control pressure the regulating valve 50 will operate at 2100 psi and the relief valve will operate at 2370 psi.

As pointed out above, the pressure at which valves 50 and 70 operate will change together as the pressure of the control air is changed. The disclosed hydraulic system thus provides a remotely adjustable back pressure relieving hydraulic regulator system which is particularly suitable for use on a rolling mill. Rolling mills specifically include mechanical means for adjusting the rolls. When the rolls are adjusted mechanically, hydraulic fluid trapped in the system must be vented or excess pressure will build up.

A small sixteen inch passage is provided beneath the bottom O-ring seal in both valves 50 and 70. The passage vents to atmosphere and should normally contain no fluid. However, when an O-ring is blown, there will be flow through the passage. The flow through the passage will indicate a damaged, worn or defective O-ring seal.

Figure 2:
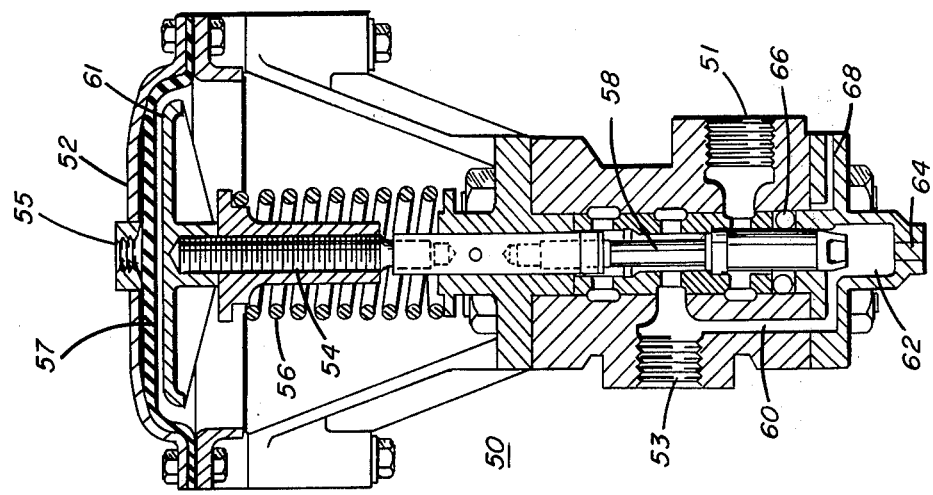
FIG. 2 is a section view of the preferred construction of the regulating valve.

Referring now to FIG. 2 there is shown a regulating valve 50 which can be utilized in the disclosed regulator system. Regulating valve 50 can be a standard valve such as valve no. C204-3001 supplied by Bellows Valvair, Akron, Ohio, which is appropriately modified. Valve 50 includes a spool 58 which is connected to be movable with operating stem 54. When spool 58 is in a raised position as shown in FIG. 2, valve 50 is closed and there is no fluid passage between the inlet 51 and the outlet 53. When spool 58 is forced to a down position, there is a fluid passage formed between inlet 51 and outlet 53 and hydraulic fluid can flow therethrough. An internal passage 60 is formed from the outlet to a chamber 62 beneath operating spool 58. The opening in the bottom of chamber 62 is closed with an appropriate plug 64. Chamber 62 in conjunction with the bottom of spool 58 acts as a hydraulic piston assembly for biasing spool 58 upward.

When initial control air pressure is applied to operator 52, spool 58 is forced downward. The outlet 53 communicates through passage 60 with chamber 62 and as the pressure on the outlet builds up, spool 58 is biased upward towards a closed position. At some pressure on outlet 53, depending on the pressure of the control air supplied to air operator 52, spool 58 will be moved to the closed position. An appropriate threaded connection 55 is provided in air operator 52 for connecting the control air thereto. Valve 50 will function to limit the pressure of the hydraulic fluid supplied therethrough.

Sealing ring 66 is provided around a portion of spool 58 to isolate the inlet 51 from chamber 62. A small passage 68 is formed in valve 50 beneath the sealing ring 66. When sealing ring 66 is no longer effective, hydraulic fluid will come out of passage 68. This will provide an indication to the operator that sealing ring 66 is defective.

Air operator 52 contains a diaphragm 57 which, when control air pressure is applied thereto, pushes downward and contacts member 61 to apply a downward biasing force to stem 54. The magnitude of the downward biasing force depends on the control air pressure and the effective area of diaphragm 57 upon which the control air acts.

Figure 3:
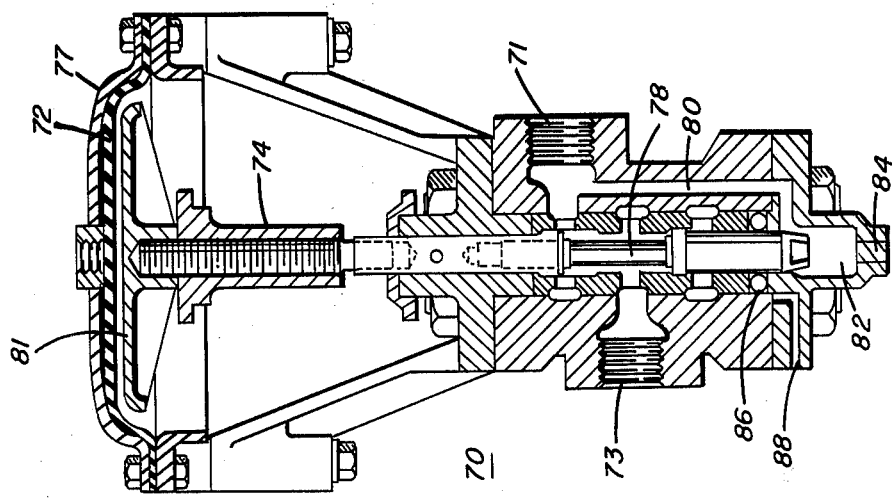
FIG. 3 is a section view of the preferred construction of the relief valve.

Referring now to FIG. 3 there is shown a detailed view of a relief valve 70 which can be utilized in a pressure regulating system according to the teaching of this invention. Control air pressure applied to air operator 72 forces a diaphragm 77 downward into contact with member 81. Member 81 then biases operating stem 74 downward. Operating stem 74 is connected to a spool 78 within valve 70. When valve 78 is in the raised position as shown in FIG. 3, a fluid passage is formed between inlet 71 and outlet 73. When spool 78 moves to the down or lowered position, inlet 71 is isolated from outlet 73 and no fluid can flow through valve 70. An internal passage 80 is formed between inlet 71 and chamber 82. Chamber 82 is located beneath the bottom of the spool 78. When lowered, the bottom of spool 78 moves within chamber 82. The bottom of spool 78 and chamber 82 act as a hydraulic piston. The opening in the bottom of chamber 82 is sealed with an appropriate plug 84. As hydraulic pressure builds up in chamber 82, spool 78 is biased upward to an open position. Thus when the pressure in chamber 82, which is equal to the pressure at its inlet 71 passes a certain point, spool 78 moves upward connecting inlet 71 to outlet 73. When inlet 71 communicates with outlet 73 the hydraulic fluid supplied to inlet 71 is vented to a return reducing the pressure at inlet 71. In the preferred embodiment, relief valve 70 is a modified Bellows Valvair Valve No. C204-3002. The standard valve is modified by plugging chamber 82 and providing an internal passage 80 between the inlet 71 and chamber 82.

A sealing ring 86 is provided around the bottom of spool 78. During modification a passage 88 is provided in valve 70 to a point beneath sealing ring 86. When seal 86 starts to leak, fluid will flow through passage 88, to the outside of valve 70, indicating that sealing ring 86 is defective. When modifying the valve, a spring which biases stem 74 upward is removed. If desired other springs, having various strengths, can be utilized for modifying the operating characteristics of valve 70.

Figure 4:
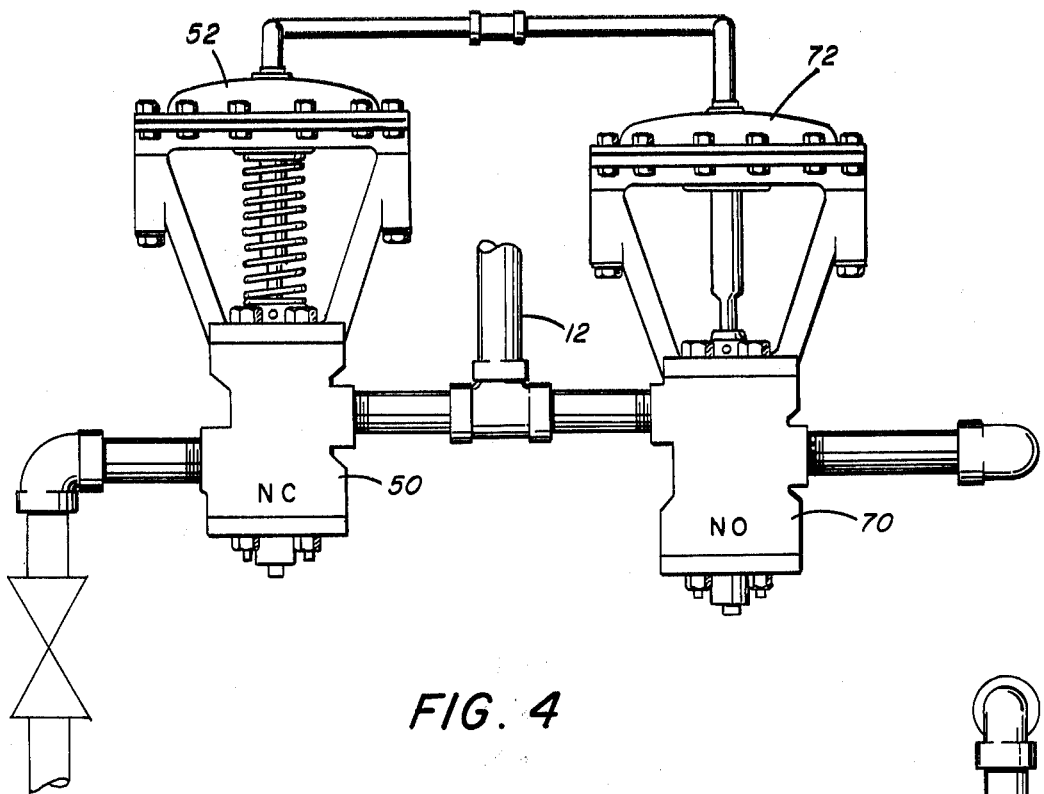
FIG. 4 is a side view of the disclosed hydraulic pressure regulator.
Figure 5:
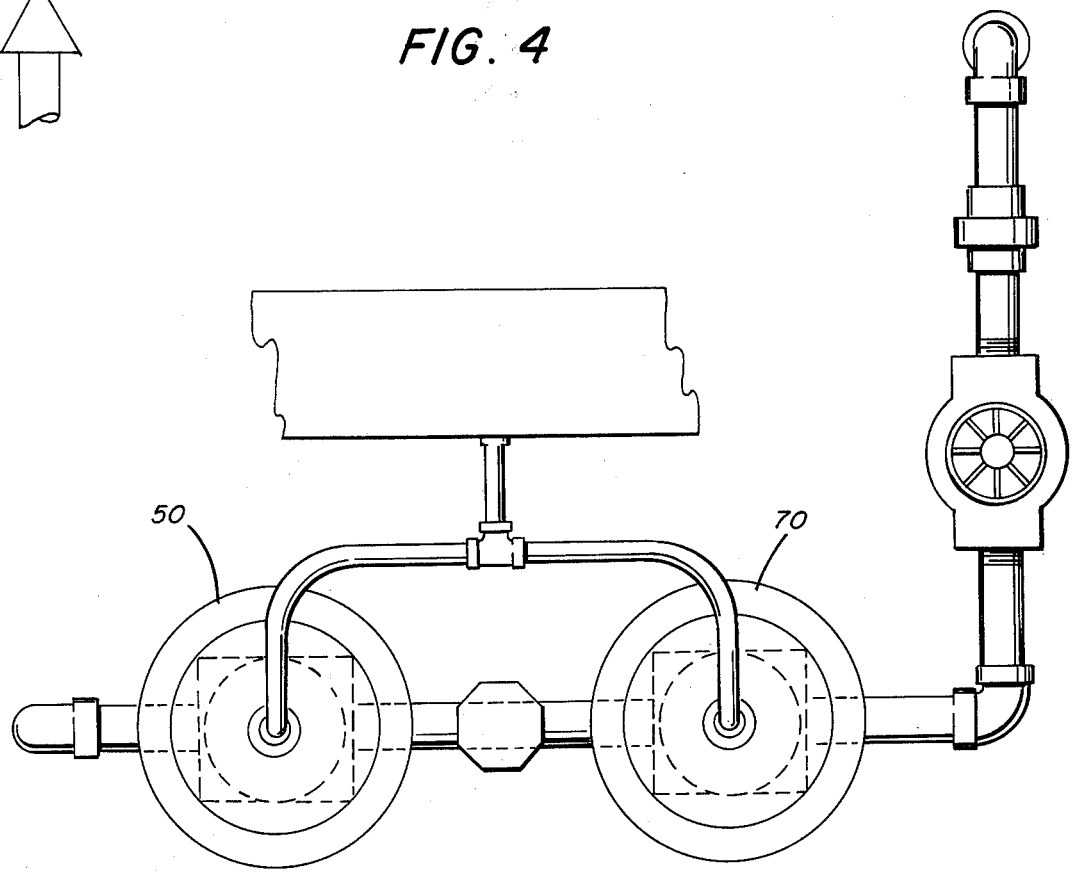
FIG. 5 is a top view of the hydraulic pressure regulator shown in FIG. 4.

Referring now to FIGS. 4 and 5, there is shown a top and side view of an actual piping arrangement for interconnecting valves 50 and 70. The outlet of valve 50 is connected to the inlet of valve 70. A line 12 is connected between valves 50 and 70 and carries fluid at the regulated pressure to the rolling mill. The air inlets to the air operators 52 and 72 are interconnected. A connection to the regulated control air supply is made from a point intermediate the air connections to air operators 52 and 72. The inlet to valve 50 is connected to a hydraulic supply and the outlet of valve 70 is connected to a hydraulic fluid return.

Figure 6:
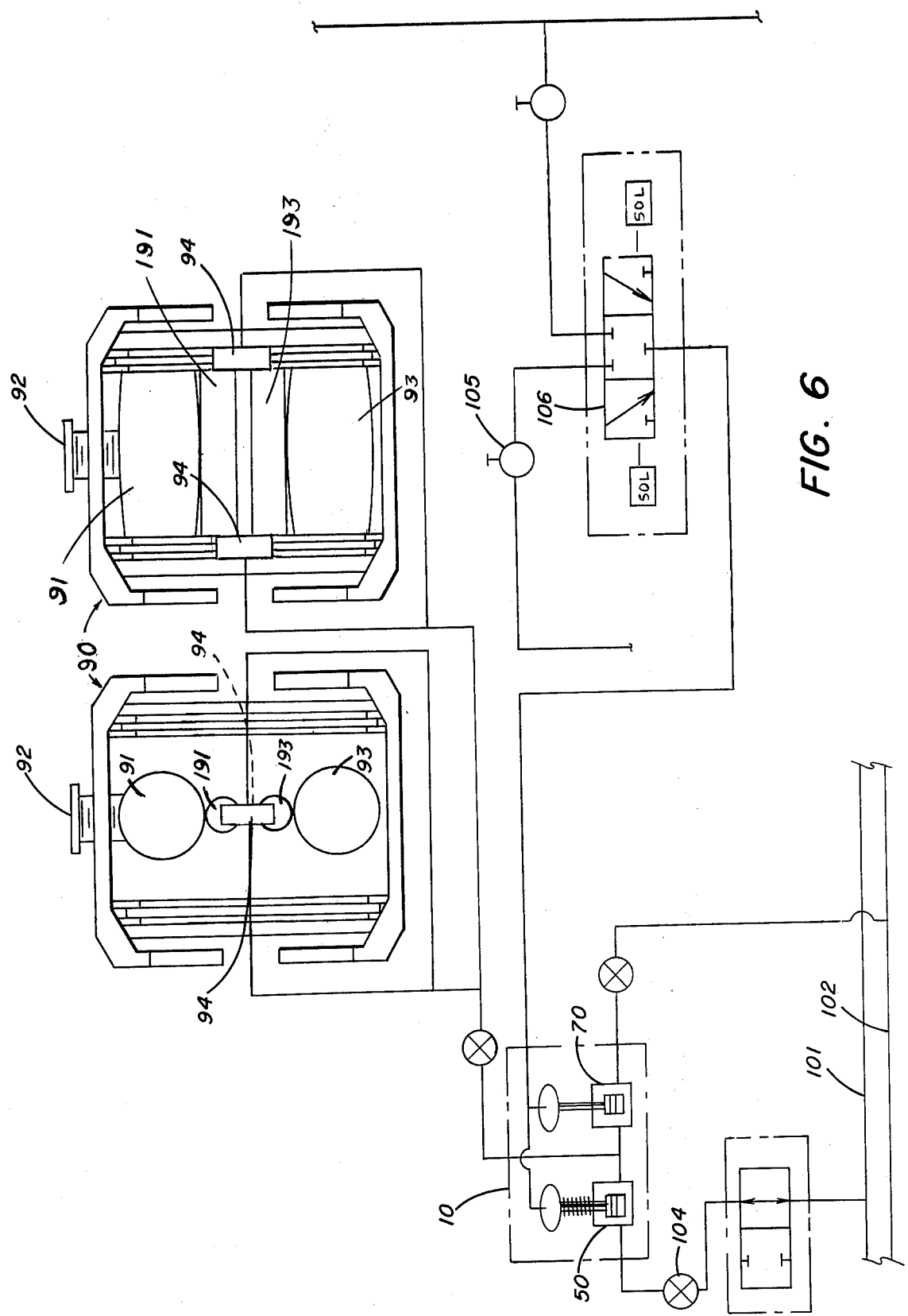
FIG. 6 is a schematic of the hydraulic pressure regulator used for roll contouring on a rolling mill; and, FIG. 7 is a graph showing hydraulic pressure versus control air pressure for a hydraulic pressure regulator according to the present invention.

Referring now to FIG. 6, there is shown a schematic representation of the hydraulic controls for a rolling mill. Front and back sides of a rolling mill are shown schematically. Rolling mill 90 has a pair of rolls 191, 193 and a pair of back up rolls 91, 93. Back up rolls 91, 93 are crowned to help simplify rolling. Rolling mill 90 includes a mechanical screw 92 for positioning the rolls 91, 93, 191 and 193. When rolling, the rolls 91, 93, 191 and 193 are positioned by a mechanical screw 92. To roll a flat sheet it is sometimes necessary to bend or contour rolls 191 and 193. The ends of the rolls are bent by hydraulic cylinders 94. Hydraulic cylinders 94 can be made to bend a crown into rolls 191 and 193 only. That is, the ends of rolls 191, 193 can be bent only apart. If necessary another set of hydraulic cylinders in back up rolls 91, 93 can be used to bend the necks together. However, it can be a problem when the ends of the rolls 191, 193 are bent together. When the ends of the rolls are hydraulically forced together there can be a problem at the tail end of the rolled member. If hydraulic pressure is still being applied when the rolled member leaves the rolls 191, 193, the ends of the rolls 191, 193 can bang together. This was an undesirable result so the computer program which controlled operation of the mill was set to relieve hydraulic pressure before the rolled member ended. This, however, caused a bad shape at the tail end of the coil and resulted in excess loss. This problem was solved by contouring the back up rolls 91, 93 so that they had the minimum required crown formed into the rolls 191, 193. This resulted in hydraulic force only being required to separate or force apart the ends of the rolls 191, 193. As pointed out above, positioning of the rolls 191, 193 front to back or both the same can be accomplished mechanically. Front to back positioning of the rolls could also be accomplished hydraulically. However, hydraulic positioning would be redundant, and in the preferred embodiment, positititioning is accomplished mechanically.

Regulator 10 must be constructed so that regulator valve 50 and relief valve 70 operate together so that the relief pressure is a selected amount above the regulator pressure. When the rolls are lowered mechanically, the hydraulic fluid must be removed or the hydraulic system could be damaged. For example, for a high position of the hydraulic press, say 6 inches, when the mill is set to a lower position by the mechanical screw 92, the hydraulic fluid must be vented or relieved to an accumulator tank to prevent the build up of excessive pressure.

Hydraulic cylinders 94 are operable between an extended position, wherein each cylinder's operating rod is extended, and a retracted position, wherein each cylinder's operating rod is withdrawn into the cylinder. If the cylinders' operating rods are extended when the rools are mechanically lowered, the operating rods will be forced into the cylinders 94. When the operating rods are forced into cylinders 94, cylinders 94 will act as a hydraulic pump causing a pressure build up in the hydraulic system connected to mill 90. If this pressure build up is not relieved the hydraulic system may be damaged. When the pressure becomes too great it is relieved by valve 70. As previously pointed out, the pressure at which valve 70 relieves is selected to be a given amount above the pressure for which valve 50 operates. This construction can thus be contrasted with a fixed pressure hydraulic relief valve. The problem with a fixed pressure hydraulic relief is that it does not operate in cooperation with the regulating valve 50. With the disclosed regulating valve 50 and relief valve 70 the operator can be assured the pressure is within a selected range, determined by the control air pressure, even after the relief valve has operated. It can thus be seen that the disclosed regulator system 10 is particularly useful on apparatus such as a rolling mill which can itself increase pressure in the hydraulic system.

Pressurized hydraulic fluid is supplied to regulator 10 from main pressure line 101. Vented hydraulic fluid is returned to return hydraulic line 102 from regulator 10. A valve 104 is provided to connect the main pressure line to regulator 10. Air tubing from a remote operator location is connected to regulator 10. The air tubing connects to a three-position air operated valve 106. One position of three way valve 106 connects the hydraulic regulator 10 to an air supply which is controlled by a mill operator. The mill operator by varying the pressure with regulator 105 from the air supply can change the hydraulic pressure to rolling mill 90. The second position for three way valve 106 is a neutral position where no air supply is connected to regulator 10. The third position of three way valve 106 connects the operator air inlets for regulator 10 to an air supply at a set pressure of 35 psi. When the valve is in this position, the hydraulic fluid will be controlled at the hydraulic pressure determined by the 35 psi air supplied to operators 52 and 72. This position of roll balance is used when changing rolls and working on the mill. When mechanical resistance is not present on hydraulic cylinders 94 and full hydraulic pressure is applied, the cylinders can be damaged. Full hydraulic pressure with no mechanical resistance can force the end caps off the hydraulic cylinders.

The hydraulic fluid used in mill applications is mostly water, with a little water soluble mineral oil added. This type of fluid is used to prevent a fire hazard and to save cost. The hydraulic systems in a typical mill are very large. Losses may be high and the use of more expensive fluid is prohibitive. The fluid uitlized is more erosive and difficult to work with than straight mineral oil. The regulator utilized must be capable of handling this fluid and also capable of handling the required large volume.

What is claimed is:

1. A remotely adjustable, back pressure relieving hydraulic pressure regulating system for providing hydraulic fluid at a regulated pressure from a hydraulic supply, in response to a control air signal, comprising:

a first air-operated valve operable between an open position and a closed position, having an inlet connected to the hydraulic supply and an outlet, constructed to be biased to the open position by the pressure of the control air signal and baised to the closed position by the hydraulic pressure at its outlet;

a second air-operated valve operable between an open position and a closed position, having an inlet connected to the outlet of said first air-operated valve and an outlet connected to a hydraulic return, constructed to be biased to the closed position by the pressure of the control air signal and biased to the open position by the hydraulic pressure at its inlet; and, air pressure adjusting means for adjusting the pressure of the control air signal.

2. A hydraulic pressure regulating system as claimed in claim 1 wherein:

said first air-operated valve and said second air-operated valve are constructed so the hydraulic pressure required to move said first air-operated valve to the closed position is less than the hydraulic pressure required to move said second air-operated valve to the open position.

3. A hydraulic pressure regulating system as claimed in claim 1 wherein:

the regulated hydraulic pressure is variable up to 3000 psi in response to a variation in the pressure of the control air signal up to 60 psi.

4. A hydraulic pressure regulating system as claimed in claim 1 comprising:

a three position valve, which when in the first position connects the adjustable control air signal to the hydraulic pressure regulating system, when in the second position connects no air signal to the hydraulic pressure regulating system, and when in the third position connects a constant pressure air signal to the hydraulic pressure regulating system.

5. An adjustable pressure regulating system for supplying a selected pressure from a hydraulic supply and relieving pressure to a hydraulic return system when a pressure significantly above the selected hydraulic pressure occurs comprising:

a first air-operated valve, having an inlet port and an outlet port, operable between an open position and a closed position and constructed to move from the open position to the closed position when the pressure at its outlet is approximately equal to the selected hydraulic pressure;

a second air-operated valve, having an inlet and an outlet, operable between an open position and a closed position and constructed to move from the closed position to the open position when the pressure at its inlet is above the selected hydraulic pressure;

said first air-operated valve movable to the closed position as a function of the operating air pressure applied thereto;

said second air-operated valve movable to the open position as a function of the operating air pressure applied thereto; and air pressure adjusting means connected for changing the operating air pressure supplied to said first and second air operated valve.

6. An adjustable pressure regulating system as claimed in claim 5 comprising:

a common connection for connecting the same operating air pressure to said first air operated valve and said second air operated valve.

7. A dual valve assembly particularly useful for providing hydraulic pressure regulation comprising:

a pressure regulating valve, having an inlet connected to a hydraulic pressurized supply, movable to a closed position when the pressure at its outlet exceeds a selected value; and, a pressure relief valve, having an inlet connected to the outlet of said pressure regulating valve and an outlet connected to a hydraulic return movable to an open position when the pressure at its inlet exceeds the selected value by a predetermined amount.

8. A dual valve assembly as claimed in claim 7 wherein said pressure regulating valve comprises:

a movable internal spool for opening and closing the passage between the inlet and outlet;

a chamber into which said spool is movable; and, an internal passage from the outlet to said chamber to maintain said chamber at the same pressure as the outlet for biasing said spool to the closed position.

9. A dual valve assembly as claimed in claim 8 wherein said pressure regulating valve comprises:

an air operator linked to said movable internal spool for biasing said spool to the open position with a force which is related to the pressure of the applied air.

10. A dual valve assembly as claimed in claim 9 wherein said pressure regulating valve comprises:

a spring biasing said movable internal spool to the closed position.

11. A dual valve assembly as claimed in claim 9 wherein said pressure regulating valve comprises:

a sealing ring disposed around said spool to isolate the inlet from said chamber; and, a small passage formed from the outside of the valve to a position beneath said sealing ring through which fluid can flow when said sealing ring is defective.

12. A dual valve assembly as claimed in claim 7 wherein said pressure relief valve comprises:

a movable internal spool for opening and closing the passage between the inlet and outlet;

a chamber into which said spool is movable; and, an internal passage from the inlet to said chamber to maintain said chamber at the same pressure as the inlet for biasing said spool to the open position.

13. A dual valve assembly as claimed in claim 12 wherein said pressure relief valve comprises:

an air operator linked to said movable internal spool for biasing said spool to the closed position with a force which is related to the pressure of the applied air.

14. A dual valve assembly as claimed in claim 13 wherein said pressure relief valve comprises:

a sealing ring disposed around said spool to isolate the outlet from said chamber; and, a small package formed from outside the valve to a position beneath said sealing ring through which fluid can flow when said sealing ring is defective.

15. In a hydraulically and mechanically adjustable rolling mill having a pair of separable rollers, mechanical means for adjusting the position of the rollers, hydraulic adjusting means connected to the ends of said pair of rollers for contouring the rollers and a supply line providing hydraulic fluid at a regulated pressure to the hydraulic adjusting means, the improvement comprising:

an air-operated, remotely adjustable, back pressure relieving, hydraulic regulator system for controlling the supply of hydraulic fluid to the hydraulic adjusting means, wherein said air-operated remotely adjustable back pressure relieving hydraulic regulator comprises, a first valve which remains open until the pressure at its outlet reaches a selected pressure;

a second valve which remains closed until the pressure at its inlet which is supplied to the hydraulic adjustable rollers exceeds by an amount the selected pressure; and, means for changing the selected pressure.

16. A method for providing hydraulic fluid at a regulated pressure from a pressurized supply to hydraulic apparatus comprising the steps of:

connecting the pressurized supply to the hydraulic apparatus until the pressure applied to the hydraulic apparatus reaches a selected value;

disconnecting the pressurized supply from the hydraulic apparatus when the pressure applied to the hydraulic apparatus exceeds the selected value;

connecting the hydraulic apparatus to a hydraulic return when the pressure applied to the hydraulic apparatus exceeds the selected value by a given amount to reduce the hydraulic pressure applied to the hydraulic apparatus; and, disconnecting the hydraulic apparatus from the hydraulic return when the pressure applied to the hydraulic apparatus falls below the selected value plus a given amount.

17. A rolling mill comprising:

a pair of separable rollers;

mechanical means for varying the separation of the rollers;

hydraulic cylinders connected to said pair of rollers for contouring said rollers;

a hydraulic system supplying hydraulic fluid to operate said hydraulic cylinders;

a hydraulic supply which provides pressurized hydraulic fluid;

an adjustable regulating valve having an inlet connected to the hydraulic supply and an outlet connected to the hydraulic system for supplying hy-